Patented Sept. 27, 1932

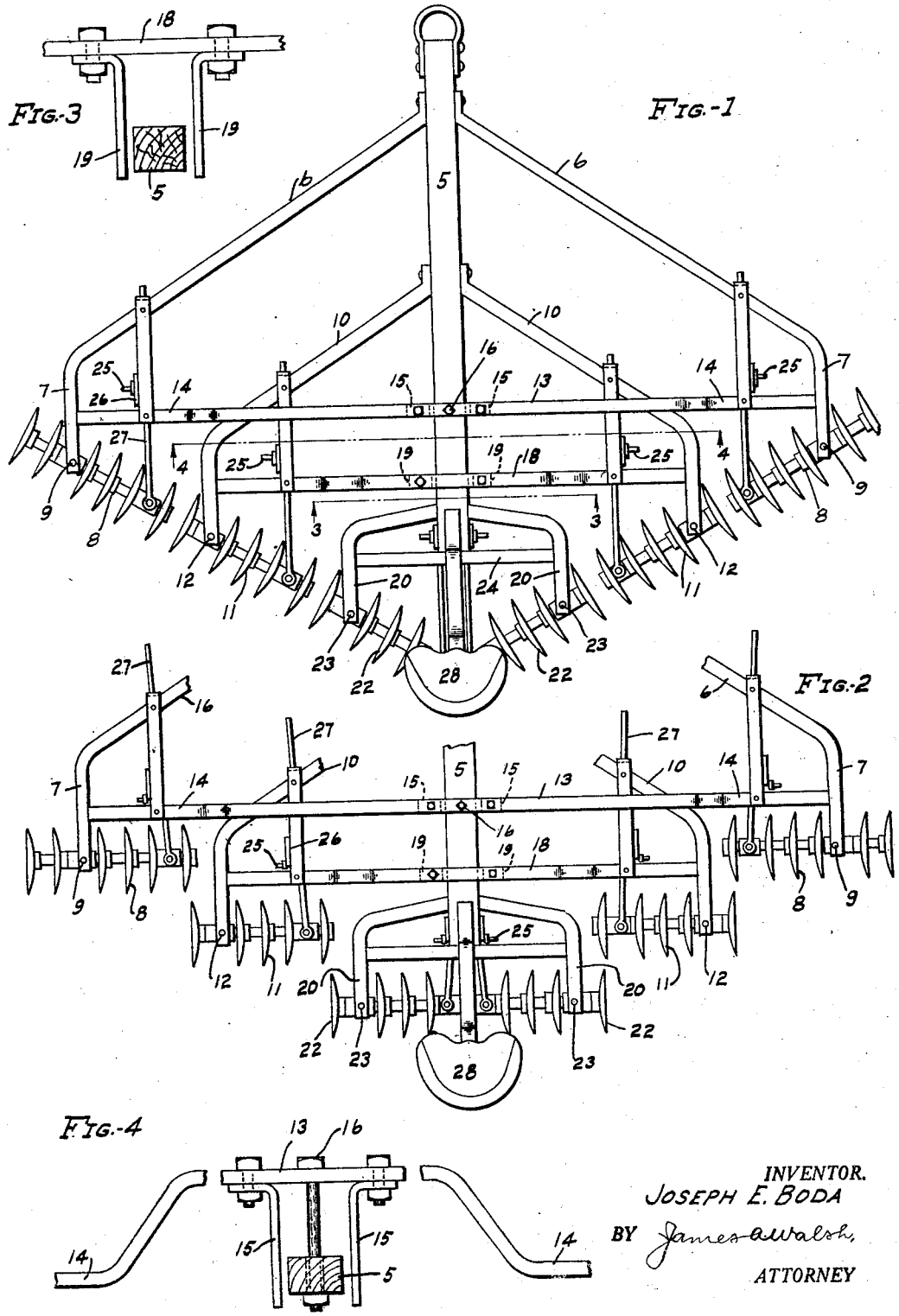

1,879,785

UNITED STATES PATENT OFFICE

JOSEPH E. BODA, OF ROCKFORD, ILLINOIS, ASSIGNOR TO J. I. CASE COMPANY, OF RACINE, WISCONSIN, A CORPORATION

DISK HARROW

Application filed October 9, 1931. Serial No. 567,865.

My object is to provide a disk harrow including a plurality of gangs so mounted that each will be self-adjustable independently of the others and each so controlled by an operator as to be readily adjusted so that its disks will be in transport or earth working position as desired, said gangs being removably mounted so that the harrow may be reduced from say six gangs as shown to four or two gangs and may also be as quickly increased to embody the desired number, and by the construction disclosed I produce an efficient and highly flexible implement for the purpose, as will hereinafter more fully appear.

In the accompanying drawing, forming part hereof, Figure 1 is a plan view of my improved harrow in earth working condition; Fig. 2, a fragmentary plan view showing the gangs in transport position; Fig. 3, a detail section taken on the dotted lines 3—3 in Fig. 1; and Fig. 4 is also a detail section taken on the dotted lines 4—4 in Fig. 1.

In said drawing the numeral 5 indicates a tongue or draft member of any suitable character and constituting part of the narrow frame, and to the forward end of which member frame sections 6 are fixedly secured, said sections being angulated a considerable portion of their length and terminating in parallel gang supports 7 to which outer gangs 8 are pivotally secured, at 9, so that they may adjust themselves to ground inequalities. Rearwardly of said frame members 6, I connect to the draft member 5 a pair of intermediate gang supports 10 similar to the members 6, and to which supports 10 gangs 11 are pivotally connected, at 12, the forward members 6 being connected laterally by a cross-bar 13 having depending portions terminating in horizontal ends 14, the middle portion of said cross-bar having guide members 15 bolted or otherwise secured thereto, which guides extend downwardly along the sides of the draft member 5, and which latter is connected to the cross-bar by a bolt 16 or otherwise, by which guides lateral movement of the frame structure 6, 13, will be limited and the guide members prevented by said draft member from undue lateral play or climbing, as will be apparent from Fig. 4. The gang supports 10 are also connected laterally by a cross-bar 18 having guide members 19 extending therefrom alongside the draft member 5, as indicated in Fig. 3, for the same purpose as explained respecting guides 15. Rearwardly of the gang supports 18 I connect inner gang supports 20 substantially of the character of the forward and intermediate supports, and which inner supports are pivotally connected to the inner gangs 22, at 23, and are laterally connected by a cross-bar 24.

It will thus be seen that each gang is pivotally connected to an individual support and therefore independently mounted from each other so that as the harrow traverses a field each gang will automatically follow the ground irregularities encountered in its path. The direction of travel of each gang and its disks is controlled by a lever 25 co-acting with a ratchet quadrant 26 in a well known manner, and when the harrow is in earth working condition the lever has been adjusted to angularly position the gang to which it is connected, and as each gang is pivoted to its individual support and equipped with a like lever it will be understood that when in earth working condition they will have assumed the angular relation to the draft member 5 as indicated in Fig. 1. Upon leaving the field or otherwise it is desirable to place the gangs so that their disks will be in parallel relation to the draft member, and this is readily accomplished by adjusting the lever 25 in reverse direction, which movement, through its reciprocating arm 27, swings its gang, pivotally connected to its support, in a forward direction so that its disks will assume parallel relation to the draft member and the gangs brought into a stepped or staggered arrangement as indicated in Fig. 2, whereupon all the disks will be in proper position for transporting the harrow from field to field and the like. It will be understood also that a seat 28 may be mounted on the draft member in any preferred manner. As each gang has but a single pivotal connection with its support it will be readily understood that the width of the harrow may be readily diminished and increased as desired by removing or adding one or more pairs of its gangs and their supports, and that by the construction disclosed I produce an efficient and highly flexible harrow the draft of which is distributed through its draft member to the respective gang supports, as plainly indicated in Fig. 1.

I claim as my invention:

1. In a disk harrow, a draft member, a pair of laterally movable outer gang supports connected to the draft member, disk gangs pivotally connected to the supports, a cross member securing said supports, means securing the cross member to the draft member, and means on the cross-member and positioned adjacent the sides of the draft member for limiting lateral movement of the cross-member and parts associated therewith.

2. In a harrow, a draft member, a cross-member securing said supports, means on the cross-member and movable thereby into contact with the draft member for limiting lateral movement of the cross-member and parts associated therewith, a pair of laterally movable outer gang supports secured to the draft member, a pair of inner gang supports secured to the draft member, a pair of laterally movable intermediate gang supports secured to the draft member, a cross-member securing the intermediate supports, means on the latter member and movable thereby into contact with the draft member for limiting lateral movement of the intermediate support and parts associated therewith, disk gangs secured to each of the supports, and means for adjusting the gangs into earth working and transport positions in relation to the draft member.

3. In a harrow, a draft member, a pair of laterally movable outer gang supports secured to the forward end of the draft member, a pair of inner gang supports secured to the draft member, a pair of intermediate gang supports secured to the draft member, disk gangs pivotally secured to each of the supports, a cross-member securing the outer supports, means on said cross-member adapted to be moved into contact with the draft member for limiting lateral movement of the outer supports, and other means on the intermediate support for limiting the lateral movement thereof in relation to the draft member.

4. In a harrow, a draft member, a pair of laterally movable gang supports connected to said member, means for laterally connecting said supports, means for attaching the lateral connecting means to the draft member, and guide members depending from the laterally connecting means alongside the draft member for limiting the lateral movement of the supports in relation to the draft member.

5. In a harrow, a draft member, a pair of laterally movable gang supports connected to said member, a cross-member spaced from the draft member for laterally connecting said supports, means on the cross-member positioned at each side of the draft member for limiting the lateral movement of said supports in relation to the draft member, a lever associated with each of the supports, and an arm connected to the lever and to a gang whereby the adjustment of the lever will position the gang in transport and earth working relation to the draft member.

6. In a harrow, a draft member, pairs of laterally movable gang supports connected to the draft member, gangs connected to the supports, means for laterally connecting each pair of supports, and guides depending from the lateral connections and alongside the draft member for limiting the lateral movement of the supports in relation to the draft member.

In testimony whereof I affix my signature.

JOSEPH E. BODA.